United States Patent
Fang et al.

(10) Patent No.: US 12,088,440 B1
(45) Date of Patent: Sep. 10, 2024

(54) DIFFERENTIAL CHAOS SHIFT KEYING (DCSK) COMMUNICATION METHOD AND DEVICE BASED ON THREE-DIMENSIONAL CONSTELLATION

(71) Applicant: Guangdong University of Technology, Guangzhou (CN)

(72) Inventors: Yi Fang, Guangzhou (CN); Yanhua Tan, Guangzhou (CN); Yiwei Tao, Guangzhou (CN); Chang Liu, Guangzhou (CN); Guojun Han, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/419,700

(22) Filed: Jan. 23, 2024

(30) Foreign Application Priority Data

Oct. 7, 2023 (CN) .......................... 202311282273.5

(51) Int. Cl.
*H04L 27/00* (2006.01)
*H04L 27/26* (2006.01)

(52) U.S. Cl.
CPC ........ *H04L 27/001* (2013.01); *H04L 27/2607* (2013.01)

(58) Field of Classification Search
CPC ........................... H04L 27/001; H04L 27/2607
See application file for complete search history.

(56) References Cited

U.S. PATENT DOCUMENTS

| | | | |
|---|---|---|---|
| 7,142,617 B2 * | 11/2006 | Mohan | H04L 27/001 375/323 |
| 9,479,217 B1 | 10/2016 | Terry | |
| 2012/0226724 A1 * | 9/2012 | Radwan | G06F 7/588 708/250 |
| 2012/0250783 A1 | 10/2012 | Terry | |
| 2013/0129088 A1 * | 5/2013 | Ivarez | G06F 7/586 380/46 |

FOREIGN PATENT DOCUMENTS

| | | |
|---|---|---|
| CN | 112003804 A | 11/2020 |
| CN | 115643140 A | 1/2023 |

OTHER PUBLICATIONS

Lu Chen et al., "A Novel Chaos-Based Three-Dimensional Constellation Rotation Encryption Algorithm for OFDM-PON", 2019 18th International Conference on Optical Communications and Networks, 2019, Entire document.

* cited by examiner

*Primary Examiner* — Sung S Ahn

(57) ABSTRACT

A differential chaos shift keying (DCSK) communication method based on three-dimensional constellation is provided. Target information bit is mapped to a three-dimensional constellation symbol. An initial chaotic signal generated by a chaotic generator is processed by cyclic shift to generate a chaotic signal group including the initial chaotic signal, a first shifted chaotic signal and a second shifted chaotic signal. Information modulation is performed based on the three-dimensional constellation symbol and the chaotic signal group to obtain an information-bearing signal. A transmission signal is generated based on the information-bearing signal and the initial chaotic signal, and sent to a receiver to generate a received signal, which is subjected to information recovery analysis in the receiver to obtain an estimated information bit. A DCSK communication device based on three-dimensional constellation is also provided.

10 Claims, 8 Drawing Sheets

DIFFERENTIAL CHAOS SHIFT KEYING (DCSK) COMMUNICATION METHOD AND DEVICE BASED ON THREE-DIMENSIONAL CONSTELLATION

CROSS-REFERENCE TO RELATED APPLICATIONS

This application claims the benefit of priority from Chinese Patent Application No. 202311282273.5, filed on Oct. 7, 2023. The content of the aforementioned application, including any intervening amendments thereto, is incorporated herein by reference in its entirety.

TECHNICAL FIELD

This application relates to wireless communication, and more particularly to a differential chaos shift keying (DCSK) communication method and device based on three-dimensional constellation.

BACKGROUND

The popularization of the information industry greatly promotes the growth of the mobile Internet services. The massive service data brings serious challenges to the next-generation wireless communication network in terms of transmission rate, spectral efficiency and reliability. Therefore, there is an urgent need for a low-cost, low-power and high-reliability wireless communication technology. The chaos theory is an important branch of nonlinear science, and the chaotic communication based on this theory is a scientific theory that applies chaotic signals to the communication, which is performed mainly based on determinism, sensitive dependence on initial conditions, wide spectrum and noise-like characteristics of chaotic signals. Because of these inherent characteristics, a chaotic communication system has potential advantages in secure communication, anti-jamming and anti-multipath fading.

The research of the chaotic communication in the wireless communication mainly focuses on chaotic digital modulation. The differential chaos shift keying (DCSK) technology has been widely studied as a non-coherent chaotic digital modulation strategy because of its low-power and low-cost characteristics. Regarding the traditional DCSK communication system, the bit transmission time is divided into two time slots respectively for transmission of a reference signal and transmission of a reverse or same-direction signal carrying information bits. In this way, half of the time and energy is used to transmit the reference signal, resulting in low energy efficiency and spectral efficiency. In addition, a two-dimensional circle-constellation-assisted M-ary DCSK (C-M-DCSK) system has been proposed, which can improve the transmission efficiency of the DCSK system. However, the minimum Euclidean distance between adjacent symbols of the C-M-DCSK system is small, leading to a high bit error rate lower bound.

SUMMARY

This application provides a differential chaos shift keying (DCSK) communication method and device based on three-dimensional constellation to solve technical problems of poor actual communication effects caused by low transmission efficiency or high bit error rate in the prior art.

In view of the above problems, in a first aspect, this application provides a DCSK communication method based on three-dimensional constellation, comprising:

(S101) mapping target information bit to a three-dimensional constellation symbol;

(S102) processing an initial chaotic signal generated by a chaotic generator by cyclic shift to generate a chaotic signal group, wherein the chaotic signal group comprises the initial chaotic signal, a first shifted chaotic signal and a second shifted chaotic signal;

(S103) performing an information modulation based on the three-dimensional constellation symbol and the chaotic signal group to obtain an information-bearing signal;

(S104) generating a transmission signal based on the information-bearing signal and the initial chaotic signal, and sending the transmission signal to a receiver to generate a received signal; and (S105) performing an information recovery analysis on the received signal in the receiver to obtain an estimated information bit.

In an embodiment, the step of performing an information modulation based on the three-dimensional constellation symbol and the chaotic signal group to obtain an information-bearing signal comprises:

carrying an x-axis amplitude, a y-axis amplitude and a z-axis amplitude of the three-dimensional constellation symbol respectively on the initial chaotic signal, the first shifted chaotic signal and the second shifted chaotic signal to obtain the information-bearing signal.

In an embodiment, the step of generating a transmission signal based on the information-bearing signal and the initial chaotic signal, and sending the transmission signal to a receiver to generate a received signal comprises:

performing pulse shaping on the initial chaotic signal and the information-bearing signal respectively to obtain a pulse chaotic signal and a pulse information-bearing signal;

based on a preset carrier frequency, generating the transmission signal according to the pulse chaotic signal and the pulse information-bearing signal; and sending the transmission signal to the receiver to generate the received signal.

In an embodiment, the step of performing an information recovery analysis on the received signal in the receiver to obtain an estimated information bit comprises:

subjecting the received signal to filtering through a matched filter in the receiver to obtain a received reference signal and a received information-bearing signal;

processing the received reference signal by cyclic shift through a cyclic shift transformer to generate a received chaotic signal group, wherein the received chaotic signal group comprises the received reference signal, a third shifted chaotic signal and a fourth shifted chaotic signal;

calculating a decision vector according to the received information-bearing signal and the received chaotic signal group;

based on minimum Euclidean distance detection, estimating a label of the three-dimensional constellation symbol according to the decision vector; and performing information recovery on the estimated label to obtain the estimated information bit.

In a second aspect, this application provides a DCSK communication device based on three-dimensional constellation, comprising:

a symbol mapping unit;

a cyclic shift unit;
a modulation unit;
a generating-transmitting unit; and
an information recovery unit;
wherein the symbol mapping unit is configured to map the target information bit to the three-dimensional constellation symbol; the cyclic shift unit is configured to process the initial chaotic signal generated by the chaotic generator by cyclic shift to generate the chaotic signal group, wherein the chaotic signal group comprises the initial chaotic signal, the first shifted chaotic signal and the second shifted chaotic signal; the modulation unit is configured to perform the information modulation based on the three-dimensional constellation symbol and the chaotic signal group to obtain the information-bearing signal; the generating-transmitting unit is configured to generate the transmission signal based on the information-bearing signal and the initial chaotic signal, and send the transmission signal to the receiver to generate the received signal; and the information recovery unit is configured to perform the information recovery analysis on the received signal in the receiver to obtain the estimated information bit.

In an embodiment, the modulation unit is configured for performing:
carrying the x-axis amplitude, the y-axis amplitude and the z-axis amplitude of the three-dimensional constellation symbol respectively on the initial chaotic signal, the first shifted chaotic signal and the second shifted chaotic signal to obtain the information-bearing signal.

In an embodiment, the generating-transmitting unit is configured for performing steps of:
performing pulse shaping on the initial chaotic signal and the information-bearing signal respectively to obtain the pulse chaotic signal and the pulse information-bearing signal;
based on the preset carrier frequency, generating the transmission signal according to the pulse chaotic signal and the pulse information-bearing signal; and
sending the transmission signal to the receiver to generate the received signal.

In an embodiment, the information recovery unit is configured for performing steps of:
subjecting the received signal to filtering through the matched filter in the receiver to obtain the received reference signal and the received information-bearing signal;
processing the received reference signal by cyclic shift through the cyclic shift transformer to generate the received chaotic signal group, wherein the received chaotic signal group comprises the received reference signal, the third shifted chaotic signal and the fourth shifted chaotic signal;
calculating the decision vector according to the received chaotic signal group and the received information-bearing signal;
based on the minimum Euclidean distance detection, estimating the label of the three-dimensional constellation symbol; and
performing the information recovery on the estimated label to obtain the estimated information bit.

In a third aspect, this application provides a DCSK communication equipment based on three-dimensional constellation, comprising:
a processor; and
a memory;
wherein the memory is configured to store a program code and transmit the program code to the processor; and
the processor is configured to execute the DCSK communication method based on three-dimensional constellation according to an instruction of the program code.

This application also provides a computer-readable storage medium, wherein the computer-readable storage medium is configured to store the program code; and the program code is configured to be executed to implement the DCSK communication method based on three-dimensional constellation.

It can be seen from the above technical schemes that this application has the following beneficial effects.

This application provides a DCSK communication method based on three-dimensional constellation, including: mapping the target information bit to the three-dimensional constellation symbol; processing the initial chaotic signal generated by the chaotic generator by cyclic shift to generate the chaotic signal group, where the chaotic signal group includes the initial chaotic signal, the first shifted chaotic signal and the second shifted chaotic signal; performing the information modulation based on the three-dimensional constellation symbol and the chaotic signal group to obtain the information-bearing signal; generating the transmission signal based on the information-bearing signal and the initial chaotic signal, and sending the transmission signal to the receiver to generate the received signal; and performing information recovery analysis on the received signal in the receiver to obtain the estimated information bit.

The DCSK communication method based on three-dimensional constellation can generate the chaotic signal group, where the chaotic signal group includes the initial chaotic signal, the first shifted chaotic signal and the second shifted chaotic signal; the chaotic signal group combined with the three-dimensional constellation can improve transmission efficiency of a DCSK system; in addition, the three-dimensional constellation used in the DCSK system can significantly increase the minimum Euclidean distance between adjacent mapping symbols, so as to reduce the bit error rate of the system and ensure high reliability communication. Therefore, this application can solve technical problems of poor actual communication effects caused by low transmission efficiency or high bit error rate in the prior art.

DETAILED DESCRIPTION OF EMBODIMENTS

The present disclosure will be further described below with reference to the accompanying drawings and embodiments. It can be understood that the embodiments described herein are only to illustrate this application rather than limiting this application. And any other embodiments made by those skilled in the art based on the embodiments of the present disclosure without creative labor shall fall within the scope of the present disclosure.

Figure 1:
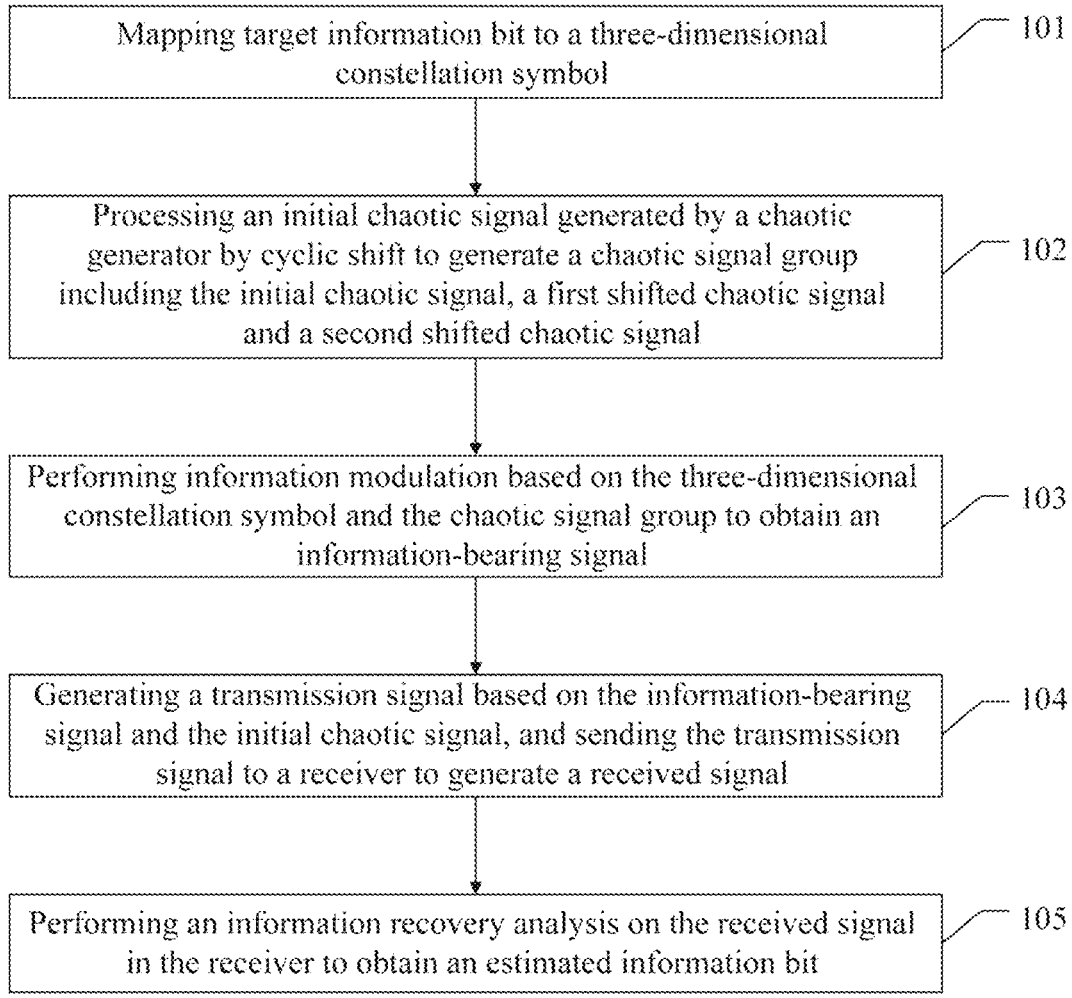
FIG. 1 is a flow chart of a DCSK communication method based on three-dimensional constellation according to an embodiment of the present disclosure.

In order to facilitate the understanding, referring to FIG. 1, the present disclosure provides an embodiment of a DCSK communication method based on three-dimensional constellation, which includes the following steps.

(S101) Target information bit is mapped to a three-dimensional constellation symbol.

(S102) An initial chaotic signal generated by a chaotic generator is processed by cyclic shift to generate a chaotic signal group, where the chaotic signal group includes the initial chaotic signal, a first shifted chaotic signal and a second shifted chaotic signal.

(S103) Information modulation is performed based on the three-dimensional constellation symbol and the chaotic signal group to obtain an information-bearing signal.

(S104) A transmission signal is generated based on the information-bearing signal and the initial chaotic signal, and is sent to a receiver to generate a received signal.

(S105) Information recovery analysis is performed on the received signal in the receiver to obtain an estimated information bit.

It should be noted that, compared to a two-dimensional constellation mapping of the prior art, the target information bit of this embodiment is mapped to the three-dimensional constellation symbol, and the three-dimensional constellation symbol is expressed as $S_i=(a_i, b_i, e_i)$, where i=0, 1, . . . , M−1; M is a modulation order; $a_i$ represents an x-axis amplitude, $b_i$ represents a y-axis amplitude, and $e_i$ represents a z-axis amplitude; the value $a_i$, the value $b_i$ and the value $e_i$ satisfy $a_i^2+b_i^2+e_i^2=1$. In addition, in order to reduce the bit error rate to a maximum extent, the embodiment uses a Gray-Mapped method for information mapping to obtain the three-dimensional constellation symbol.

It should be noted that in the traditional circle-constellation-assisted M-ary DCSK (C-M-DCSK) system, the initial chaotic signal generated by the chaotic generator is transformed into another orthogonal signal by the Hilbert filter, so as to obtain two orthogonal signals. Then a two-dimensional constellation symbol, which is an information bit through two-dimensional mapping, is carried by the two orthogonal signals. A first half of a symbol period of the two-dimensional constellation symbol is configured to send a reference signal, that is, the initial chaotic signal. A second half of the symbol period is configured to send an information-bearing signal, which can be represented as $e_k=[c_x, m_i]$, where $c_x$ represents the reference signal, $m_i$ represents the information-bearing signal. In a receiver, it is needed to calculate a corresponding decision vector based on the received signal and determine an estimated value of the information bit according to the corresponding decision vector.

In order to improve information transmission efficiency and reliability of this embodiment, the target information bit is mapped to the three-dimensional constellation symbol $S_i=(a_i, b_i, e_i)$, therefore, the initial chaotic signal is processed by cyclic shift to generate three chaotic signals (the initial chaotic signal, the first shifted chaotic signal and the second shifted chaotic signal), which are orthogonal to each other. The initial chaotic signal of the embodiment is represented as $c_x$, and $c_x=[c_{x,1}, c_{x,2}, \ldots, c_{x,\beta}]$, where $\beta$ is a spreading factor (SF). A process of obtaining the first shifted chaotic signal and the second shifted chaotic signal by cyclic shift is expressed as follows:

$$c_y = \underbrace{[c_{x,\beta-(\ell_1-1)}, c_{x,\beta-(\ell_1-2)}, \ldots, c_{x,\beta}, c_{x,1}, c_{x,2}, \ldots, c_{x,\beta-\ell_1}]}_{\text{Length } \beta}$$

$$c_z = \underbrace{[c_{x,\beta-(\ell_2-1)}, c_{x,\beta-(\ell_2-2)}, \ldots, c_{x,\beta}, c_{x,1}, c_{x,2}, \ldots, c_{x,\beta-\ell_2}]}_{\text{Length } \beta}$$

where $l_1$ is a length of the cyclic shift operation to obtain the first shifted chaotic signal $c_y$, and $l_2$ is a length of the cyclic shift operation to obtain the second shifted chaotic signal $l_z$ ($1<l_1\leq l_2<\beta$). Owing to a cross-correlation property between the three chaotic signals, the initial chaotic signal $c_x$, the first shifted chaotic signal $c_y$ and the second shifted chaotic signal $c_z$ can be approximately regarded as orthogonal to each other, as follows:

$$\sum_{u=1}^{\beta} c_{x,u}c_{y,u} \approx 0$$

$$\sum_{u=1}^{\beta} c_{x,u}c_{z,u} \approx 0$$

$$\sum_{u=1}^{\beta} c_{x,u}c_{e,u} \approx 0$$

where u represents a signal position of the chaotic signals.

In order to ensure that the three chaotic signals of the chaotic signal group satisfy a strict orthogonality, the three chaotic signals of the chaotic signal group are performed a Gram-Schmidt orthogonalization process to obtain the chaotic signal group which is strictly orthogonal.

In an embodiment, the step (S103) is performed as follows. The x-axis amplitude, the y-axis amplitude and the z-axis amplitude are respectively carried on the initial chaotic signal, the first shifted chaotic signal and the second shifted chaotic signal to obtain the information-bearing signal.

It should be noted that, the format of the information-bearing signal can be expressed as follows:

$\xi_i = a_i c_x + b_i c_y + e_i c_z$ where $\xi_i$ represents the information-bearing signal, the x-axis amplitude, the y-axis amplitude and the z-axis of the three-dimensional constellation symbols are respectively carried by different chaotic signals, which are successively corresponding to the initial chaotic signal, the first shifted chaotic signal and the second shifted chaotic signal.

In an embodiment, the step (S104) is performed as follows. A pulse shaping is performed on the initial chaotic signal and the information-bearing signal respectively to obtain a pulse chaotic signal and a pulse information-bearing signal. Based on a preset carrier frequency, the transmission signal is generated according to the pulse chaotic signal and the pulse information-bearing signal. And the transmission signal is sent to the receiver to generate the received signal.

It should be noted that, a process of the pulse shaping performed on the initial chaotic signal $c_x$ and the information-bearing signal $\xi_i$ respectively is represented as follows:

$$s_{ref}(t) = \sqrt{E_s/2} \sum_{u=1}^{\beta} c_{x,u} p(t - uT_c); \text{ and}$$

$$s_{inf}(t) = \sqrt{E_s/2} \sum_{u=1}^{\beta} \xi_{i,u} p(t - uT_c);$$

where p(t) represents a unit power pulse reshaping function, $E_S$ represents energy of a transmission symbol, $T_e$ represents chip time, and u represents a signal position of the initial chaotic signal and the information-bearing signal, such as a u-th signal element of the initial chaotic signal. $s_{ref}(t)$ represents the pulse chaotic signal, and $s_{inf}(t)$ represents the pulse information-bearing signal.

If the preset carrier frequency is $f_0$, a generation process of the transmission signal s(t) is represented as:

$$s(t) = \sqrt{2} s_{ref}(t) \cos(2\pi f_0 t) - \sqrt{2} s_{inf}(t) \sin(2\pi f_0 t)$$

where the preset carrier frequency $f_0$ must be satisfied $f_0 >> 1/T_c$; and there will be noise during the transmission signal sent to the receiver, so the received signal can be represented as r(t).

In an embodiment, the step (S105) is performed as follows. The received signal is subjected to filtering through a matched filter in the receiver to obtain a received reference signal and a received information-bearing signal. The received reference signal is processed by cyclic shift through a cyclic shift transformer to generate a received chaotic signal group, where the received chaotic signal group includes the received reference signal, a third shifted chaotic signal and a fourth shifted chaotic signal. A decision vector is calculated according to the received chaotic signal group and the received information-bearing signal. Based on minimum Euclidean distance detection, a label of the three-dimensional constellation symbol is estimated according to the decision vector. And information recovery is performed on the estimated label to obtain the estimated information bit.

Figure 3:
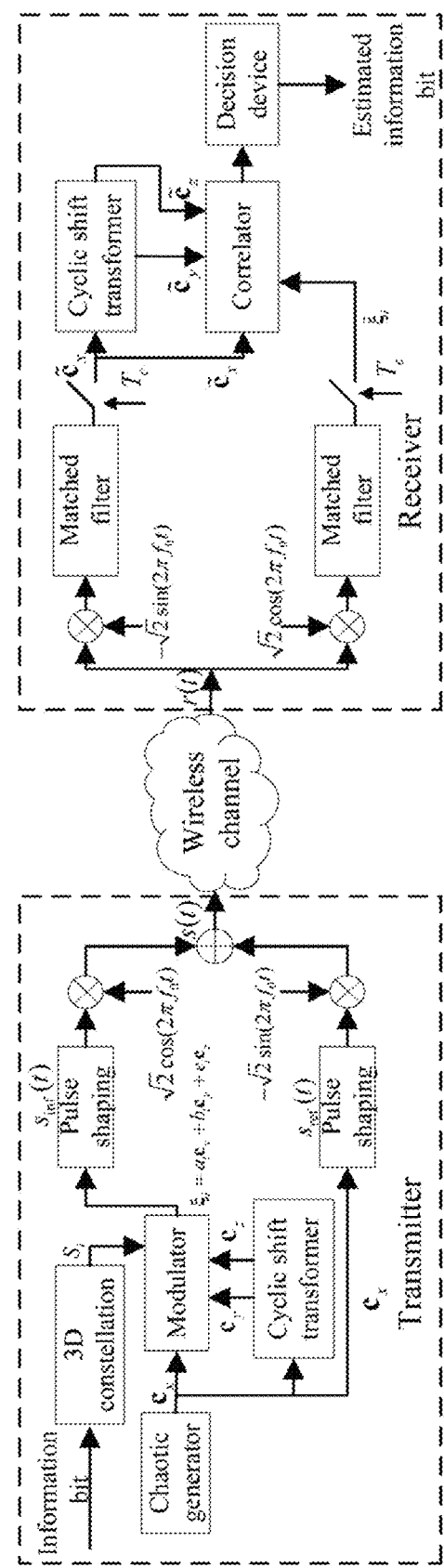
FIG. 3 schematically shows a structure of a three-dimensional constellation-based DCSK (3D-M-DCSK) system according to an embodiment of the present disclosure.

It should be noted that, referring to FIG. 3, the receiver is needed to perform an operation which is corresponding to that in the transmitter on the received signal. Therefore, the received reference signal $\bar{c}_x$ and the received information-bearing signal $\bar{\xi}_i$ are obtained from the received signal r(t) through the matched filter. Based on the process in the transmitter, the cyclic shift can also be processed according to the received reference signal $\tilde{c}_x$ to generate the corresponding received chaotic signal group including the received reference signal $\tilde{c}_x$, the third shifted chaotic signal $\tilde{c}_y$ and the fourth shifted chaotic signal $\tilde{c}_z$. And the decision vector can be calculated based on the received information-bearing signal $\bar{\xi}_i$ and the received chaotic signal group and is represented as follows:

$$Z = (z_a, z_b, z_c)$$

$$z_a = \sum_{u=1}^{\beta} \xi_{i,u} \tilde{c}_{x,u}$$

$$z_b = \sum_{u=1}^{\beta} \xi_{i,u} \tilde{c}_{y,u}$$

$$z_c = \sum_{u=1}^{\beta} \xi_{i,u} \tilde{c}_{z,u};$$

then, based on the minimum Euclidean distance detection, the label of the three-dimensional constellation symbol $S_i$ is estimated according to the decision vector Z, and the estimated label is represented as follows:

$$\hat{i} = \underset{0 \leq i \leq M-1}{\arg\min} \{|Z - S_i|\}$$

where $\hat{i}$ represents the estimated label, and |•| represents a modulus operation; and the target information bit can be recovered based on information bit according to the estimated label $\hat{i}$, so as to obtain the estimated information bit.

Figure 4:
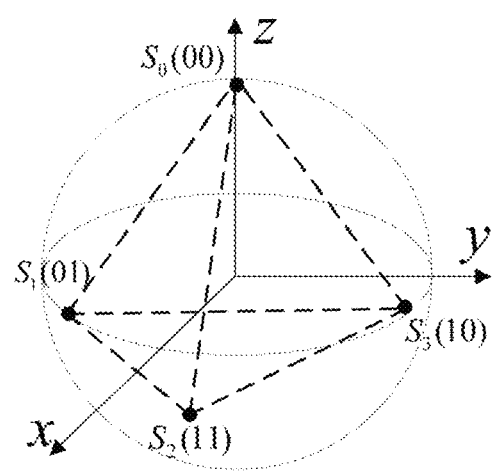
FIG. 4 is a three-dimensional constellation (M=4) according to an embodiment of the present disclosure.
Figure 5:
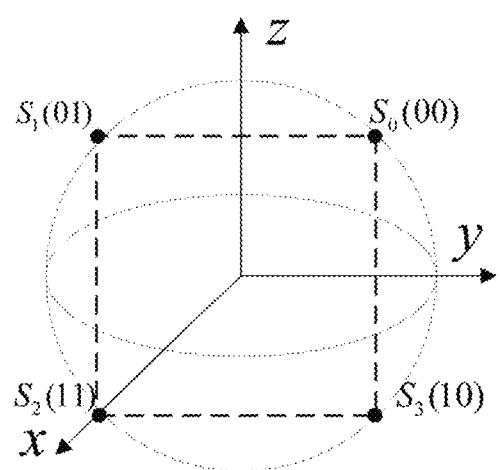
FIG. 5 is a two-dimensional constellation (M=4) according to an embodiment of the present disclosure.
Figure 6:
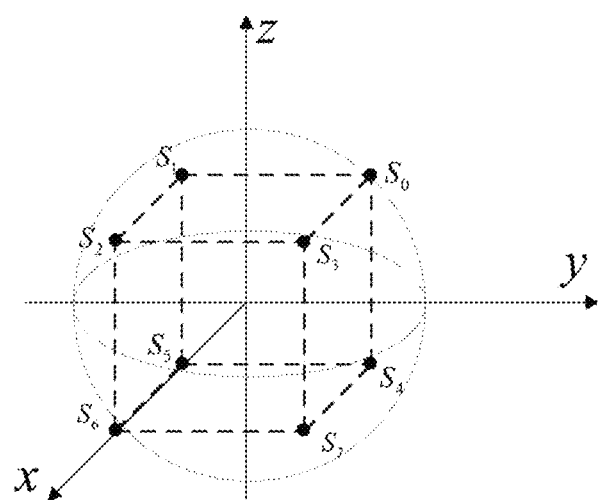
FIG. 6 is a three-dimensional constellation (M=8) according to an embodiment of the present disclosure.
Figure 7:
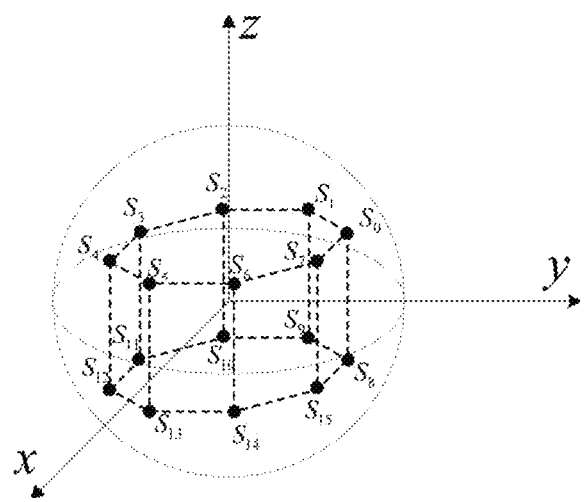
FIG. 7 is a three-dimensional constellation (M=16) according to an embodiment of the present disclosure.

In addition, it should be noted that a three-dimensional constellation (M=4) of the embodiment is shown in FIG. 4, and a shape of the three-dimensional constellation is a regular tetrahedron. Besides, the three-dimensional constellation has a characteristic of constant envelope. When M=4, this optimal construction of regular tetrahedral constellation is applied to the three-dimensional constellation-based DCSK (3D-M-DCSK) system provided in the embodiment. When the modulation order is higher, based on a two-dimensional constellation (M=4), the three-dimensional constellation is obtained through a rotation of coordinate axes, and the two-dimensional constellation is shown in FIG. 5. The three-dimensional constellation generated after the rotation is shown in FIG. 6 and FIG. 7. FIG. 6 is a three-dimensional constellation (M=8). FIG. 7 is a three-dimensional constellation (M=16). Under a given modulation order, a minimum Euclidean distance between adjacent mapping symbols can be ensured to be the same.

In addition, compared to a traditional DCSK system, the 3D-M-DCSK of the embodiment can arrive at higher data communication efficiency. Compared to the C-M-DCSK system, the 3D-M-DCSK of the embodiment can significantly increase the minimum Euclidean distance between the adjacent mapping symbols. Therefore, the embodiments of the present disclosure have a significant improvement no matter from the information transmission efficiency or from bit error rate performance.

Figure 8:
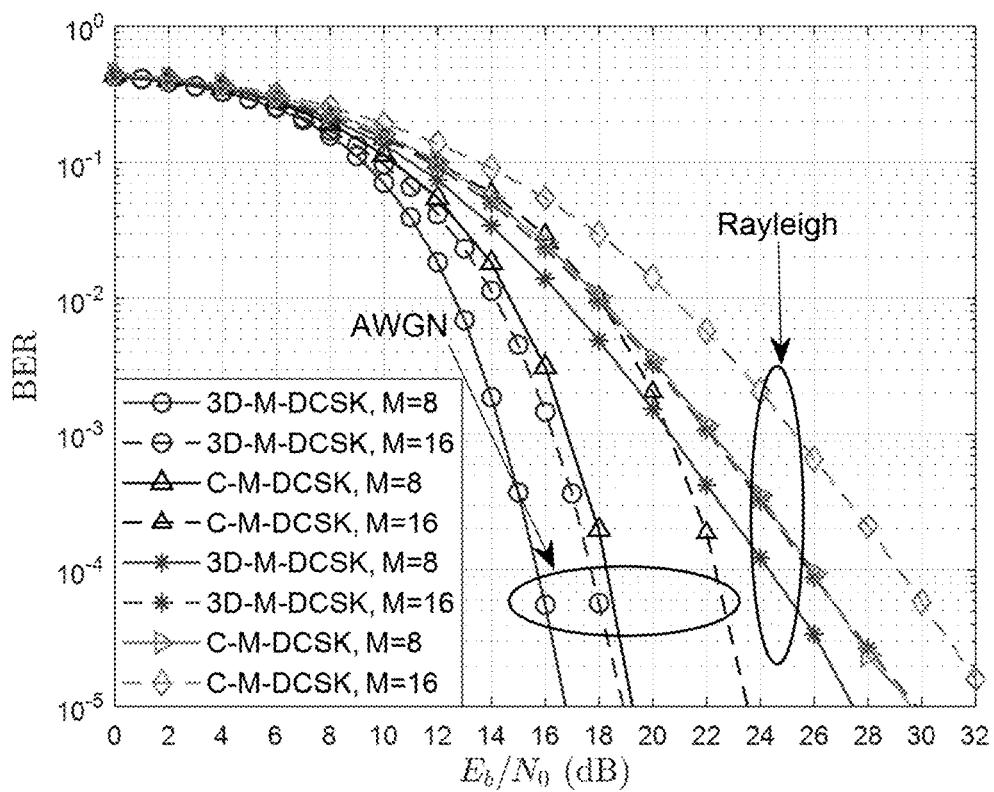
FIG. 8 schematically shows bit error rate curves of the 3D-M-DCSK system and a circle-constellation-assisted M-ary DCSK (C-M-DCSK) system under the additive white Gaussian noise channel and the multipath Rayleigh fading channel according to an embodiment of the present disclosure.

The comparison between bit error rate performances of the 3D-M-DCSK system and the C-M-DCSK system under the additive white Gaussian noise channel and the multipath Rayleigh fading channel is shown in FIG. 8, in which SF=80 and M=8, 16. Parameters of the multipath Rayleigh fading channel are set as follows: the number of paths Θ=3; each path with average power gain, i.e., $E[\lambda_1^2] = E[\lambda_2^2] = E[\lambda_2^2] = 1/3$; and the channel delays $\tau_1 = 0$, $\tau_2 = 1$, and $\tau_3 = 2$.

Both the additive white Gaussian noise channel and the multipath Rayleigh fading channel have better bit error rate performance. For example, when SF=80 and M=8, the 3D-M-DCSK system of the embodiment has a performance improvement of about 3 dB compared to the C-M-DCSK system. Similarly, on the multipath Rayleigh fading channel, the 3D-M-DCSK system has a performance improvement of about 2 dB compared to the C-M-DCSK system. These performance gains are generated that the minimum Euclidean distance of the 3D-M-DCSK system of the embodiment is greater than that of the C-M-DCSK system, which is shown in Table 1. In addition, it is easily observed that a performance gain of the 3D-M-DCSK system of the embodiment becomes more significant than that of the C-M-DCSK system as the modulation order increases. For example, on the additive white Gaussian noise channel, when M increases from 8 to 16, compared to the C-M-DCSK system, a gain obtained by the 3D-M-DCSK system of the embodiment increases from 3 dB to 5 dB. On the multipath Rayleigh fading channel, there is a similar phenomenon. The occurrence of the above phenomena is because that a loss rate of the minimum Euclidean distance of the 3D-M-DCSK system is less than that of the C-M-DCSK system as M increases.

TABLE 1

Comparison of minimum Euclidean distances of different systems

| System | Minimum Euclidean distance | | | |
| --- | --- | --- | --- | --- |
|  | M = 4 | M = 8 | M = 16 | M = 32 |
| 3D-M-DCSK | 1.6323 | 1.1547 | 0.7148 | 0.3830 |
| C-M-DCSK | 1.4142 | 0.7654 | 0.3902 | 0.1960 |

The DCSK communication method based on three-dimensional constellation of the embodiment can generate the chaotic signal group composed of the three chaotic signals through performing the cyclic shift process. The chaotic signal group combined with the three-dimensional constellation can improve the transmission efficiency of a DCSK system. In addition, the three-dimensional constellation is configured for the DCSK system, which can significantly increase the minimum Euclidean distance between adjacent mapping symbols, so as to reduce the bit error rate of the system and ensure high reliability communication. Therefore, the present disclosure can solve a technical problem that the prior art has low transmission efficiency or high bit error rate, resulting in poor actual communication effect.

Figure 2:
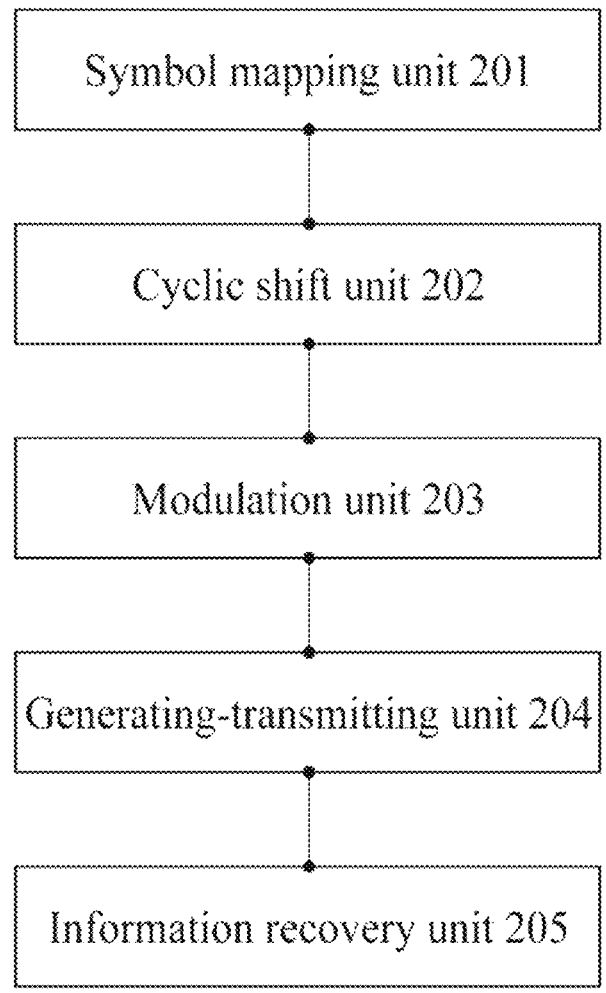
FIG. 2 schematically shows a structure of a DCSK communication device based on three-dimensional constellation according to an embodiment of the present disclosure.

In order to facilitate understanding, referring to FIG. 2, the present disclosure provides a DCSK communication device based on three-dimensional constellation, including a symbol mapping unit 201, a cyclic shift unit 202, a modulation unit 203, a generating-transmitting unit 204, and an information recovery unit 205. The symbol mapping unit 201 is configured to map the target information bit to the three-dimensional constellation symbol; the cyclic shift unit 202 is configured to perform the cyclic shift process on the initial chaotic signal generated by the chaotic generator to generate the chaotic signal group, and the chaotic signal group includes the initial chaotic signal, the first shifted chaotic signal and the second shifted chaotic signal; the modulation unit 203 is configured to perform the information modulation based on the three-dimensional constellation symbol and the chaotic signal group to obtain the information-bearing signal; the generating-transmitting unit 204 is configured to send the transmission signal to the receiver to generate the received signal after generating the transmission signal based on the information-bearing signal and the initial chaotic signal; and the information recovery unit 205 is configured to perform the information recovery analysis on the received signal in the receiver to obtain the estimated information bit.

In an embodiment, the modulation unit 203 is configured for performing:
carrying the x-axis amplitude, the y-axis amplitude and the z-axis amplitude of the three-dimensional constellation symbol respectively on the initial chaotic signal, the first shifted chaotic signal and the second shifted chaotic signal to obtain the information-bearing signal.

In an embodiment, the generating-transmitting unit 204 is configured for performing steps of:
performing pulse shaping on the initial chaotic signal and the information-bearing signal respectively to obtain the pulse chaotic signal and the pulse information-bearing signal;
based on the preset carrier frequency, generating the transmission signal according to the pulse chaotic signal and the pulse information-bearing signal; and sending the transmission signal to the receiver to generate the received signal.

In an embodiment, the information recovery unit is configured for performing steps of:
subjecting the received signal to filtering through the matched filter in the receiver to obtain the received reference signal and the received information-bearing signal;
processing the received reference signal by cyclic shift through the cyclic shift transformer to generate the received chaotic signal group, where the received chaotic signal group includes the received reference signal, the third shifted chaotic signal and the fourth shifted chaotic signal;
calculating the decision vector according to the received information-bearing signal and the received chaotic signal group;
based on the minimum Euclidean distance detection, estimating the label of the three-dimensional constellation symbol according to the decision vector; and
performing the information recovery on the estimated label to obtain the estimated information bit.

The present disclosure also provides a DCSK communication equipment based on three-dimensional constellation, including:
a processor; and
a memory;
where the memory is configured to store a program code and transmit the program code to the processor; the processor is configured to execute the DCSK communication method based on three-dimensional constellation according to an instruction of the program code.

The present disclosure also provides a computer-readable storage medium. The computer-readable storage medium is configured to store the program code. And the program code is configured to be executed to implement the DCSK communication method based on three-dimensional constellation.

It should be understood that the devices and method disclosed herein can be implemented by other means in the embodiments provided above. For example, the devices of the embodiments described above are only illustrative. And the division of units is only for logic function division, and the actual implement can have another division, such as a plurality of units or elements can be combined or integrated into another system, or some characteristics can be ignored or not be executed. In addition, the connection between the plurality of units or elements shown or discussed herein can be a direct coupling, or an indirect coupling through some ports, devices or units, or a communication connection which can be electrical, mechanical or other form.

The units described as separate components can be or not be physically separated, and the components displayed as units can be or not be physical units, that is, the components can be located at one place or be distributed to multiple network units. And some or all units can be selected according to the actual needs to arrive at the purpose of the technical schemes of the present disclosure.

In addition, the functional units in the embodiments of the present disclosure can be integrated in one processing unit, or can be exist separately and physically. Or two or more units can be integrated in one processing unit. The above integrated unit can be realized in the form of hardware or software functional unit.

The integrated unit can be stored in a computer-readable storage medium if implemented in the form of software functional unit and sold or used as an independent product. Based on this, the technical scheme of this application can be shown in the form of software product in essence, or in part that contribute to the prior art, or in part or all of this technical scheme. The software product is stored in a storage medium and includes orders to execute all or part of steps described in the embodiments of this application through a computer device (which can be a personal computer, a server or a network device). The storage medium includes various media which can store program code, such as a USB flash disk (U disk), a mobile hard disk drive (HDD), a read-only memory (ROM), a random access memory (RAM), a disk or a compact disc (CD).

Described above are only several embodiments of the present disclosure, and are not intended to limit the disclosure. Though the disclosure has been described in detail with reference to the embodiments, it should be noted that those skilled in the art can still make various modifications, variations and replacements. It should be understood that those modifications, variations and replacements made by those skilled in the art without departing from the spirit and scope of the present disclosure shall fall within the scope of the present disclosure defined by the appended claims.

What is claimed is:

1. A differential chaos shift keying (DCSK) communication method based on three-dimensional constellation, comprising:
    mapping target information bit to a three-dimensional constellation symbol;
    processing an initial chaotic signal generated by a chaotic generator by cyclic shift to generate a chaotic signal group, wherein the chaotic signal group comprises the initial chaotic signal, a first shifted chaotic signal and a second shifted chaotic signal;
    performing an information modulation based on the three-dimensional constellation symbol and the chaotic signal group to obtain an information-bearing signal;
    generating a transmission signal based on the information-bearing signal and the initial chaotic signal, and sending the transmission signal to a receiver to generate a received signal; and
    performing an information recovery analysis on the received signal in the receiver to obtain an estimated information bit.

2. The DCSK communication method of claim 1, wherein the step of performing an information modulation based on the three-dimensional constellation symbol and the chaotic signal group to obtain an information-bearing signal comprises:
    carrying an x-axis amplitude, a y-axis amplitude and a z-axis amplitude of the three-dimensional constellation symbol respectively on the initial chaotic signal, the first shifted chaotic signal and the second shifted chaotic signal to obtain the information-bearing signal.

3. The DCSK communication method of claim 1, wherein the step of generating a transmission signal based on the information-bearing signal and the initial chaotic signal, and sending the transmission signal to a receiver to generate a received signal comprises:
    performing pulse shaping on the initial chaotic signal and the information-bearing signal respectively to obtain a pulse chaotic signal and a pulse information-bearing signal;
    based on a preset carrier frequency, generating the transmission signal according to the pulse chaotic signal and the pulse information-bearing signal; and
    sending the transmission signal to the receiver to generate the received signal.

4. The DCSK communication method of claim 1, wherein the step of performing an information recovery analysis on the received signal in the receiver to obtain an estimated information bit comprises:
    subjecting the received signal to filtering through a matched filter in the receiver to obtain a received reference signal and a received information-bearing signal;
    processing the received reference signal by cyclic shift through a cyclic shift transformer to generate a received chaotic signal group, wherein the received chaotic signal group comprises the received reference signal, a third shifted chaotic signal and a fourth shifted chaotic signal;
    calculating a decision vector according to the received information-bearing signal and the received chaotic signal group;
    based on minimum Euclidean distance detection, estimating a label of the three-dimensional constellation symbol according to the decision vector; and
    performing information recovery on an estimated label to obtain the estimated information bit.

5. A differential chaos shift keying (DCSK) communication device based on three-dimensional constellation, comprising:
    a symbol mapping unit;
    a cyclic shift unit;
    a modulation unit;
    a generating-transmitting unit; and
    an information recovery unit;
    wherein the symbol mapping unit is configured to map a target information bit to a three-dimensional constellation symbol;
    the cyclic shift unit is configured to process an initial chaotic signal generated by a chaotic generator by cyclic shift to generate a chaotic signal group, wherein the chaotic signal group comprises the initial chaotic signal, a first shifted chaotic signal and a second shifted chaotic signal;
    the modulation unit is configured to perform an information modulation based on the three-dimensional constellation symbol and the chaotic signal group to obtain an information-bearing signal;
    the generating-transmitting unit is configured to generate a transmission signal based on the information-bearing signal and the initial chaotic signal, and send the transmission signal to a receiver to generate a received signal; and
    the information recovery unit is configured to perform an information recovery analysis on the received signal in the receiver to obtain an estimated information bit.

6. The DCSK communication device of claim 5, wherein the modulation unit is configured for performing:
    carrying an x-axis amplitude, a y-axis amplitude and a z-axis amplitude of the three-dimensional constellation symbol respectively on the initial chaotic signal, the first shifted chaotic signal and the second shifted chaotic signal to obtain the information-bearing signal.

7. The DCSK communication device of claim 5, wherein the generating-transmitting unit is configured for performing steps of:
    performing pulse shaping on the initial chaotic signal and the information-bearing signal respectively to obtain a pulse chaotic signal and a pulse information-bearing signal;

based on a preset carrier frequency, generating the transmission signal according to the pulse chaotic signal and the pulse information-bearing signal; and sending the transmission signal to the receiver to generate the received signal.

8. The DCSK communication device of claim 5, wherein the information recovery unit is configured for performing steps of:

subjecting the received signal to filtering through a matched filter in the receiver to obtain a received reference signal and a received information-bearing signal;

processing the received reference signal by cyclic shift through a cyclic shift transformer to generate a received chaotic signal group, wherein the received chaotic signal group comprises the received reference signal, a third shifted chaotic signal and a fourth shifted chaotic signal;

calculating a decision vector according to the received chaotic signal group and the received information-bearing signal;

based on minimum Euclidean distance detection, estimating a label of the three-dimensional constellation symbol according to the decision vector; and performing information recovery on the estimated label to obtain the estimated information bit.

9. A differential chaos shift keying (DCSK) communication equipment based on three-dimensional constellation, comprising:

a processor; and a memory;

wherein the memory is configured to store a program code and transmit the program code to the processor; and the processor is configured to execute the DCSK communication method of claim 1 according to an instruction of the program code.

10. A non-transitory computer-readable storage medium, wherein the computer-readable storage medium is configured to store a program code; and the program code is configured to be executed to implement the DCSK communication method of claim 1.

* * * * *